(12) United States Patent
Okido et al.

(10) Patent No.: US 10,723,926 B2
(45) Date of Patent: Jul. 28, 2020

(54) REFRIGERATING MACHINE OIL AND REFRIGERATING MACHINE WORKING FLUID COMPOSITION

(71) Applicant: JXTG NIPPON OIL & ENERGY CORPORATION, Tokyo (JP)

(72) Inventors: Takeshi Okido, Tokyo (JP); Hiroko Shimpo, Tokyo (JP); Yuya Mizutani, Tokyo (JP); Hidetoshi Ogata, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/748,343

(22) PCT Filed: Jul. 26, 2016

(86) PCT No.: PCT/JP2016/071913
§ 371 (c)(1),
(2) Date: Jan. 29, 2018

(87) PCT Pub. No.: WO2017/022576
PCT Pub. Date: Feb. 9, 2017

(65) Prior Publication Data
US 2018/0215977 A1    Aug. 2, 2018

(30) Foreign Application Priority Data
Jul. 31, 2015    (JP) .................................. 2015-152467

(51) Int. Cl.
*C09K 5/04* (2006.01)
*C10M 171/00* (2006.01)
*C10M 105/38* (2006.01)
*C10M 105/42* (2006.01)

(52) U.S. Cl.
CPC ............. *C09K 5/04* (2013.01); *C10M 105/38* (2013.01); *C10M 105/42* (2013.01); *C10M 171/008* (2013.01); *C10M 2207/2835* (2013.01); *C10M 2207/3025* (2013.01); *C10N 2220/022* (2013.01); *C10N 2220/302* (2013.01); *C10N 2230/02* (2013.01); *C10N 2230/06* (2013.01); *C10N 2230/70* (2013.01); *C10N 2240/30* (2013.01)

(58) Field of Classification Search
CPC ..... C09K 5/04; C10M 113/02; C10M 173/02; C10M 105/32; C10M 105/38; C10M 2201/02; C10M 2201/041; C10M 105/42; C10M 171/008; C10M 2207/3025; C10M 2207/2835; C10N 2250/141; C10N 2230/70; C10N 2240/30; C10N 2220/022; C10N 2220/302; C10N 2230/02; C10N 2230/06

USPC .......................................................... 252/68
See application file for complete search history.

(56) References Cited

U.S. PATENT DOCUMENTS

| 5,238,590 | A  | * | 8/1993  | Mizui .................. C08G 64/183 252/68 |
| 9,676,983 | B2 | * | 6/2017  | Saito .................. C10M 171/008 |
| 9,719,001 | B2 | * | 8/2017  | Okido ..................... C09K 5/045 |
| 9,725,630 | B2 | * | 8/2017  | Okido ..................... C09K 5/041 |
| 9,783,762 | B2 | * | 10/2017 | Takahashi .......... C10M 171/008 |
| 2012/0142564 | A1 | * | 6/2012  | Duchesne ............ C10M 159/24 508/186 |
| 2013/0207024 | A1 | * | 8/2013  | Takigawa ........... C10M 171/008 252/68 |
| 2015/0344760 | A1 | * | 12/2015 | Saito .................. C10M 171/008 252/68 |
| 2016/0053153 | A1 | * | 2/2016  | Okido ..................... C09K 5/045 252/68 |
| 2016/0289523 | A1 | * | 10/2016 | Okido ..................... C09K 5/041 |
| 2018/0273817 | A1 | * | 9/2018  | Sawada ................. C09K 5/045 |
| 2018/0305599 | A1 | * | 10/2018 | Sawada ................ C10M 169/04 |

FOREIGN PATENT DOCUMENTS

| JP | H09-316479       | 12/1997 |           |
| JP | 2012/508807      | 4/2012  |           |
| TW | 2014/35080       | 9/2014  |           |
| WO | 2010/056449      | 5/2010  |           |
| WO | 2014/087916 A1   | 6/2014  |           |
| WO | WO-2014156737 A1 | * 10/2014 | ............ C09K 5/045 |
| WO | WO-2014156738 A1 | * 10/2014 | ............ C09K 5/042 |
| WO | 2015/111522 A1   | 7/2015  |           |

OTHER PUBLICATIONS

International Search Report issued in International App. No. PCT/JP2016/071913, dated Oct. 11, 2016, with English translation.
International Preliminary Report on Patentability issued in WO Application No. PCT/JP2016/071913 dated Feb. 15, 2018, with English translation.
Office Action issued in TW Application No. 105124221.

* cited by examiner

*Primary Examiner* — Douglas J McGinty
(74) *Attorney, Agent, or Firm* — Greenblum & Bernstein, P.L.C.

(57) ABSTRACT

The present invention provides a working fluid composition for a refrigerating machine containing: a refrigerating machine oil containing: a first ester that is a polyol ester of dipentaerythritol and at least one fatty acid selected from fatty acids having 4 to 10 carbon atoms, and has a kinematic viscosity at 100° C. of 7.0 mm$^2$/s or more; and a second ester that is a complex ester of a polyhydric alcohol containing at least one selected from neopentyl glycol, trimethylolpropane and pentaerythritol, a polybasic acid having 6 to 12 carbon atoms, and a monohydric alcohol having 4 to 18 carbon atoms or a fatty acid having 4 to 18 carbon atoms; and a refrigerant containing difluoromethane.

17 Claims, No Drawings

REFRIGERATING MACHINE OIL AND REFRIGERATING MACHINE WORKING FLUID COMPOSITION

TECHNICAL FIELD

The present invention relates to a refrigerating machine oil and a working fluid composition for a refrigerating machine. "Refrigerating machines" include air conditioners for automobiles, dehumidifiers, refrigerators, freezing-refrigerating warehouses, automatic vending machines, showcases, cooling apparatuses for chemical plants or the like, air conditioners for housing, packaged air conditioners, and heat pumps for hot water supply herein.

BACKGROUND ART

A refrigerating machine has a refrigerant circulation system including a compressor, a condenser, an expansion mechanism, an evaporator and the like. The refrigerant circulation system utilizes the phenomenon of a liquid taking heat from the surrounding at the time of vaporization, and in the system, a cycle including the compression and the temperature rise of a refrigerant vaporized in the compressor, the liquefaction of the refrigerant by heat dissipation condensation in the condenser, reduced pressure expansion in the expansion mechanism and the vaporization of the refrigerant in the evaporator is repeated. A lubricating oil for lubricating the internal slide member (called a "refrigerating machine oil") is applied to the compressor.

In the refrigerant circulation system as described above, a part of a refrigerating machine oil is discharged from the compressor with the refrigerant due to the mechanism thereof. Therefore, compatibility with a refrigerant in addition to lubricity in the compressor (namely, lubricity in the presence of the refrigerant) is required from a refrigerating machine oil. When the refrigerating machine oil has compatibility, the refrigerating machine oil can be circulated in a refrigerant circulation system with the refrigerant and return to the compressor, and the amount of the refrigerating machine oil in the compressor can be secured enough.

However, it is not necessarily easy to achieve both the lubricity and the compatibility with a refrigerant of a refrigerating machine oil. For example, in the case of a refrigerating machine oil that exhibits high compatibility with a refrigerant, since a refrigerant is dissolved in the refrigerating machine oil, the viscosity of the whole mixture of the refrigerant and the refrigerating machine oil (working fluid composition for a refrigerating machine) decreases, and consequently, the lubricity may become insufficient. The lubricity and the compatibility with refrigerants of refrigerating machine oils vary greatly with the combination of the refrigerating machine oils and the refrigerants. Additionally, the solution of the above-mentioned subject becomes difficult, and it is also partly because the estimate of the adaptability of a refrigerant and a refrigerating machine oil is difficult.

Then, refrigerating machine oils and working fluid composition for a refrigerating machines for achieving both the lubricity and the compatibility with refrigerants have been examined. For example, in Patent Literature 1, a refrigerating machine oil composition that has compatibility suitable for hydro-fluoroalkane-based refrigerants such as 1,1,1,2-tetrafluoroethane (R134a) and the characteristics of which such as seizure resistance are improved at the same time are disclosed.

In Patent Literature 2, a working fluid composition for a refrigerating machine that is capable of maintaining a thick oil slick, has a great effect of abrasion resistance and is excellent in long-term reliability in the presence of a difluoromethane (R32) refrigerant is disclosed.

CITATION LIST

Patent Literature

Patent Literature 1: Japanese Unexamined Patent Publication No. H9-316479
Patent Literature 2: International Publication No. WO 2014/087916

SUMMARY OF INVENTION

Technical Problem

An object of the present invention is to provide a refrigerating machine oil and a working fluid composition for a refrigerating machine that can achieve both refrigerant compatibility and lubricity at a high level in the presence of a refrigerant containing difluoromethane.

Solution to Problem

Incidentally, in the case of a refrigerating machine oil composition for 1,1,1,2-tetrafluoroethane (R134a) as described in Patent Literature 1, it is supposed that pentaerythritol is preferable as a constituent alcohol of a polyol ester. It is considered that a constituent fatty acid of a polyol ester having smaller number of carbon atoms leads to excellent compatibility and a constituent fatty acid of a polyol ester having larger number of carbon atoms leads to excellent seizure resistance.

Meanwhile, the present inventors have dared to adopt polyol esters the constituent alcohols of which are dipentaerythritol, and tried to improve the refrigerant compatibility and the lubricity of refrigerating machine oils containing the polyol esters in the presence of a difluoromethane refrigerant. Consequently, surprisingly enough, it turned out that it is possible to achieve both the refrigerant compatibility and the lubricity at a high level in the presence of a refrigerant containing a difluoromethane refrigerant by combining a polyol ester that is an ester of dipentaerythritol and a specific fatty acid and has specific kinematic viscosity at 100° C. with a specific complex ester. The present inventors repeated examination further based on such findings and have completed the present invention.

That is, the present invention provides a working fluid composition for a refrigerating machine containing: a refrigerating machine oil containing: (A) a first ester, wherein the first ester is a polyol ester of dipentaerythritol and at least one fatty acid selected from fatty acids having 4 to 10 carbon atoms, and having a kinematic viscosity at 100° C. of 7.0 mm$^2$/s or more; and (B) a second ester, wherein the second ester is a complex ester of: a polyhydric alcohol containing at least one selected from neopentyl glycol, trimethylolpropane and pentaerythritol; a polybasic acid having 6 to 12 carbon atoms; and a monohydric alcohol having 4 to 18 carbon atoms or a fatty acid having 4 to 18 carbon atoms; and a refrigerant containing difluoromethane.

The present invention also provides: a refrigerating machine oil containing: (A) a first ester, wherein the first ester is a polyol ester of dipentaerythritol and at least one fatty acid selected from fatty acids having 4 to 10 carbon atoms, and having a kinematic viscosity at 100° C. of 7.0 mm²/s or more; and (B) a second ester, wherein the second ester is a complex ester of: a polyhydric alcohol containing at least one selected from neopentyl glycol, trimethylolpropane and pentaerythritol; a polybasic acid having 6 to 12 carbon atoms; and a monohydric alcohol having 4 to 18 carbon atoms or a fatty acid having 4 to 18 carbon atoms, wherein the refrigerating machine oil is used with a refrigerant containing difluoromethane.

In one aspect of a working fluid composition for a refrigerating machine and a refrigerating machine oil according to the present invention, a polyhydric alcohol that constitutes the complex ester of the above (B) may further contain a dihydric alcohol having 2 to 10 carbon atoms other than neopentyl glycol in addition to at least one selected from neopentyl glycol, trimethylolpropane and pentaerythritol.

A fatty acid constituting the polyol ester of the above (A) may be at least one selected from fatty acids having 5 carbon atoms.

Advantageous Effects of Invention

According to the present invention, a refrigerating machine oil and a working fluid composition for a refrigerating machine that can achieve both refrigerant compatibility and lubricity at a high level in the presence of a refrigerant containing difluoromethane can be provided.

DESCRIPTION OF EMBODIMENTS

Embodiments of the present invention will be described in detail hereinafter.

A working fluid composition for a refrigerating machine according to this embodiment contains: a refrigerating machine oil containing: a first ester that is a polyol ester of dipentaerythritol and at least one fatty acid selected from fatty acids having 4 to 10 carbon atoms (an ester of dipentaerythritol and an acid consisting of only at least one fatty acid selected from fatty acids having 4 to 10 carbon atoms), and has a kinematic viscosity at 100° C. of 7.0 mm²/s or more; and a second ester that is a complex ester of: a polyhydric alcohol containing at least one selected from neopentyl glycol, trimethylolpropane and pentaerythritol; a polybasic acid having 6 to 12 carbon atoms; and a monohydric alcohol having 4 to 18 carbon atoms or a fatty acid having 4 to 18 carbon atoms; and a refrigerant containing difluoromethane.

The refrigerating machine oil according to this embodiment contains a mixed base oil containing the first ester and the second ester.

The first ester, which is a polyol ester, will be described. A constituent fatty acid of the first ester is a fatty acid having 4 to 10 carbon atoms, and examples of the fatty acid include linear or branched butanoic acid, linear or branched pentanoic acid, linear or branched hexanoic acid, linear or branched heptanoic acid, linear or branched octanoic acid, linear or branched nonanoic acid, and linear or branched decanoic acid. In view of improving lubricity further, it is preferable that the fatty acid contains a fatty acid having 4 to 9 carbon atoms, and it is more preferable that the fatty acid contains a fatty acid having 5 carbon atoms. For example, branched butanoic acid, linear pentanoic acid, branched pentanoic acid, branched hexanoic acid, branched heptanoic acids, 2-ethylhexanoic acid, and 3,5,5-trimethylhexanoic acid are still more preferable as the fatty acid having 4 to 9 carbon atoms, and linear pentanoic acid and/or branched pentanoic acid is still more preferable as the fatty acid having 5 carbon atoms. As branched pentanoic acids, 2-methylbutanoic acid, 3-methylbutanoic acid, and 2,2-dimethylpropanoic acid are preferable, and 2-methylbutanoic acid is still more preferable. In view of balancing refrigerant compatibility and lubricity at a higher level, a mixed fatty acid containing linear pentanoic acid and 2-methylbutanoic acid is particularly preferable as the fatty acid having 5 carbon atoms.

In view of achieving both refrigerant compatibility and lubricity at a higher level, it is preferable that the first ester is a polyol ester of dipentaerythritol and a mixed acid containing two or more branched fatty acids having 4 to 9 carbon atoms, it is more preferable that this mixed acid contains linear and/or branched fatty acid having 5 carbon atoms, and it is still more preferable that this mixed acid is a mixed fatty acid containing linear pentanoic acid and/or 2-methylbutanoic acid. This mixed acid may contain at least one fatty acid selected from fatty acids having 4 to 6 carbon atoms and a branched fatty acid having 9 carbon atoms, and may be a mixed acid of 2-methylpropanoic acid and 3,5,5-trimethylhexanoic acid, and may be a mixed acid of linear pentanoic acid and/or branched pentanoic acid and 3,5,5-trimethylhexanoic acid.

When the first ester is an ester of dipentaerythritol and a mixed fatty acid containing linear pentanoic acid and branched pentanoic acid, the molar ratio linear pentanoic acid/branched pentanoic acid in the mixed fatty acid constituting the ester is preferably 95/5 to 5/95, more preferably 80/20 to 20/80, or still more preferably 70/30 to 30/70 since the balance among base oil characteristics (hereinafter also called simply "balance among characteristics" in some cases) such as the kinematic viscosity, the viscosity index and the low temperature storage stability of the obtained ester is good. In view of still more excellent kinematic viscosity and refrigerant compatibility at the time of combination with the second ester mentioned below, it is preferable that the molar ratio of linear pentanoic acid/branched pentanoic acid in the mixed fatty acid constituting the first ester is less than 1, it is preferable that the molar ratio is 0.8 or less, and it is more preferable that the molar ratio is 0.7 or less.

In view of achieving both refrigerant compatibility and lubricity at a still higher level, the kinematic viscosity at 100° C. of the first ester is preferably 7.0 to 100 mm²/s, more preferably 7.5 to 50 mm²/s, still more preferably 7.5 to 20 mm²/s, and particularly preferably 8.0 to 15 mm²/s, 8.5 to 12 mm²/s, or 9.0 to 12 mm²/s. The kinematic viscosity at 100° C. of the first ester is 7.0 mm²/s or more, in view of further improving lubricity under service conditions in a compressor, is preferably 7.5 mm²/s or more, more preferably 8.0 mm²/s or more, still more preferably 8.5 mm²/s or more, and particularly preferably 9.0 mm²/s or more. In view of excellent balance among characteristics, the kinematic viscosity at 100° C. of the first ester is preferably 100 mm²/s or less, more preferably 50 mm²/s or less, still more preferably 20 mm²/s or less, particularly preferably 15 mm²/s or less, and much more preferably 12 mm²/s or less. The kinematic viscosity and the viscosity index in the present invention mean values measured and calculated based on JIS K 2283.

In view of improving refrigerant compatibility further, the kinematic viscosity at 40° C. of the first ester may be 30 to 500 mm²/s, and may be 40 to 300 mm²/s or 50 to 100 mm²/s. The viscosity index of the first ester may be 70 or more, and may be 80 to 200.

The second ester, which is a complex ester, will be described. The second ester is obtained by, for example, (1) a method involving adjusting the molar ratio between a polyhydric alcohol and a polybasic acid, to thereby produce an ester intermediate with carboxyl groups of the polybasic acid remaining, and then esterifying the carboxyl groups with a monohydric alcohol, (2) a method involving adjusting the molar ratio between a polyhydric alcohol and a polybasic acid, to thereby produce an ester intermediate with hydroxyl groups of the polyhydric alcohol remaining, and then esterifying the hydroxyl groups with a fatty acid, and the like. A comparatively strong acid is formed in the case of hydrolyzation at the time of use as a refrigerating machine oil, and therefore, the complex ester obtained by the above method (2) may be a little less stable than the complex ester obtained by the above method (1). As a complex ester in this embodiment, a complex ester obtained by the above method (1), that is more stable, is preferable.

A constituent polyhydric alcohol of the second ester is a polyhydric alcohol containing at least one selected from neopentyl glycol, trimethylolpropane and pentaerythritol, and neopentyl glycol and trimethylolpropane are preferable as the polyhydric alcohol in order to have the viscosity suitable as a refrigerating machine oil. When tetrahydric pentaerythritol is used, the viscosity of the obtained complex ester is higher than those in the cases of neopentyl glycol and trimethylolpropane, and the low temperature characteristics also tend to be inferior to those in the cases of neopentyl glycol and trimethylolpropane. Additionally, neopentyl glycol, which is capable of adjusting viscosity widely, is more preferable.

A constituent polyhydric alcohol of the second ester preferably further contains a dihydric alcohol having 2 to 10 carbon atoms other than neopentyl glycol in addition to at least one selected from neopentyl glycol, trimethylolpropane and pentaerythritol in view of improving the lubricity further.

The dihydric alcohols having 2 to 10 carbon atoms other than neopentyl glycol include ethylene glycol, propanediol, butanediol, pentanediol, hexanediol, 2-methyl-1,3-propanediol, 3-methyl-1,5-pentanediol and 2,2-diethyl-1,3-pentanediol. Among these, in view of the balance among the characteristics of synthesized base oils, butanediol is preferable. Butanediols include 1,2-butanediol, 1,3-butanediol, 1,4-butanediol and 2,3-butanediol, and 1,3-butanediol and 1,4-butanediol are more preferable, and 1,4-butanediol is particularly preferable from an aspect of the balance of characteristics. The amount of a dihydric alcohol having 2 to 10 carbon atoms other than neopentyl glycol is preferably 1.2 mol or less, more preferably 0.8 mol or less, still more preferably 0.4 mol or less, and is preferably 0.01 mol or more, and still more preferably 0.1 mol or more, based on 1 mol of a polyhydric alcohol selected from neopentyl glycol, trimethylolpropane and pentaerythritol.

The constituent polybasic acid of the second ester is a polybasic acid having 6 to 12 carbon atoms, and the polybasic acids include adipic acid, pimelic acid, suberic acid, azelaic acid, sebacic acid, phthalic acid and trimellitic acid. Among these, due to excellent balance among the characteristics of synthesized esters and good availability, aliphatic divalent carboxylic acids, particularly adipic acid and sebacic acid, are preferable, and especially adipic acid is more preferable. The amount of this polybasic acid is preferably 5.0 mol or less, more preferably 4.0 mol or less, still more preferably 3.0 mol or less, particularly preferably 2.5 mol or less, and is preferably 0.1 mol or more, preferably 0.5 mol or more, still more preferably 1.0 mol or more, and particularly preferably 1.5 mol or more, based on 1 mol of a polyhydric alcohol selected from neopentyl glycol, trimethylolpropane and pentaerythritol.

When carboxyl groups remain in a complex ester intermediate formed by the reaction of the above-mentioned polyhydric alcohol and polybasic acid, the carboxyl groups are esterified by a monohydric alcohol having 4 to 18 carbon atoms. The monohydric alcohols having 4 to 18 carbon atoms include aliphatic alcohols such as linear or branched butanol, linear or branched pentanol, linear or branched hexanol, a linear or branched heptanol, linear or branched octanol, linear or branched nonanol, linear or branched decanol, linear or branched dodecanol, and oleyl alcohol. In view of the balance among characteristics, the monohydric alcohol having 4 to 18 carbon atoms is preferably a monohydric alcohol having 6 to 10 carbon atoms, particularly a monohydric alcohol having 8 to 10 carbon atoms and especially 2-ethylhexanol and 3,5,5-trimethylhexanol in view of good low temperature characteristics of synthesized complex esters.

When hydroxyl groups remain in a complex ester intermediate formed by the reaction of the above-mentioned polyhydric alcohol and polybasic acid, the hydroxyl groups are esterified by a fatty acid having 4 to 18 carbon atoms. The fatty acids having 4 to 18 carbon atoms include linear or branched butanoic acid, linear or branched pentanoic acid, linear or branched hexanoic acid, linear or branched heptanoic acid, linear or branched octanoic acid, linear or branched nonanoic acid, linear or branched decanoic acid, linear or branched dodecanoic acid, and oleic acid. The fatty acid having 4 to 18 carbon atoms is preferably a fatty acid having 8 to 10 carbon atoms, and especially 2-ethylhexanoic acid and 3,5,5-trimethylhexanoic acid are preferable in view of low temperature characteristics.

In view of achieving both refrigerant compatibility and lubricity at a still higher level, the kinematic viscosity at 100° C. of the second ester is preferably 4 to 100 mm$^2$/s, more preferably 7 to 70 mm$^2$/s, still more preferably 10 to 50 mm$^2$/s, and particularly preferably 13 to 25 mm$^2$/s. In view of improving lubricity under service conditions in a compressor further, the kinematic viscosity at 100° C. of the second ester is preferably 4 mm$^2$/s or more, more preferably 7 mm$^2$/s or more, still more preferably 10 mm$^2$/s or more, and particularly preferably 13 mm$^2$/s or more. In view of excellent balance among characteristics, the kinematic viscosity at 100° C. of the second ester is preferably 100 mm$^2$/s or less, more preferably 70 mm$^2$/s or less, still more preferably 50 mm$^2$/s or less, and particularly preferably 25 mm$^2$/s or less.

The kinematic viscosity at 40° C. of the complex ester may be 20 to 500 mm$^2$/s, and may be 40 to 400 mm$^2$/s, 50 to 250 mm$^2$/s, or 100 to 200 mm$^2$/s. The viscosity index may be 100 or more, and may be 110 to 160.

In view of achieving both refrigerant compatibility and lubricity at a still higher level, the content of the first ester is preferably 40 to 95% by mass, more preferably 50 to 95% by mass, still more preferably 55 to 95% by mass, preferably 40 to 90% by mass, more preferably 50 to 90% by mass, and still more preferably 55 to 90% by mass, based on the total amount of the refrigerating machine oil. In view of improving lubricity in a compressor further, the content of the first ester is preferably 40% by mass or more, more preferably 50% by mass or more, still more preferably 55% by mass or more, and particularly preferably 60% by mass or more, based on the total amount of the refrigerating machine oil. In view of improving refrigerant compatibility further, the content of the first ester is preferably 95% by mass or less, and more preferably 90% by mass or less, based on the total amount of the refrigerating machine oil.

In view of the capability of achieving both refrigerant compatibility and lubricity at a still higher level, the content of the second ester is preferably 5 to 40% by mass, more preferably 5 to 30% by mass or 10 to 40% by mass, still more preferably 10 to 30% by mass, based on the total amount of the refrigerating machine oil: In view of improving refrigerant compatibility further, the content of the second ester is preferably 5% by mass or more, and is preferably that the 10% by mass or more, based on the total amount of the refrigerating machine oil. In view of achieving both refrigerant compatibility and lubricity at a still higher level, the content of the second ester is preferably 40% by mass or less, and more preferably 30% by mass or less, based on the total amount of the refrigerating machine oil.

When the content of the first ester is defined as (A) and the content of the second ester is defined as (B) in a refrigerating machine oil according to this embodiment, in view of the capability of achieving both refrigerant compatibility and lubricity at a still higher level, the content ratio (A)/(B) is preferably 2 to 20, more preferably 2 to 10, still more preferably 2 to 8, preferably 3 to 20, more preferably 4 to 10, and still more preferably 4 to 8 by mass ratio. In view of the refrigerant compatibility with a refrigerant containing difluoromethane, the content ratio (A)/(B) is preferably 2 or more, more preferably 3 or more, and still more preferably 4 or more by mass ratio. In view of improving lubricity, the content ratio (A)/(B) is preferably 20 or less, more preferably 10 or less, and still more preferably 8 or less by a mass ratio.

A refrigerating machine oil in this embodiment may further contain other base oil ingredients in addition to a mixed base oil containing the first ester and the second ester. The other base oil ingredients include mineral oil-based base oils and synthetic base oils. As mineral oil-based base oils and synthetic base oils, base oils usable in the field of refrigerating machine oils can be used.

When a refrigerating machine oil contains other base oil ingredients, in view of achieving both refrigerant compatibility and lubricity at a higher level, the content of the mixed base oil consisting of the first ester and the second ester is preferably 80% by mass or more, and particularly preferably 95% by mass or more, based on the total amount of the refrigerating machine oil.

In view of achieving both refrigerant compatibility and lubricity at a still higher level, the kinematic viscosity at 100° C. of the refrigerating machine oil in this embodiment is preferably 7.0 to 100 mm$^2$/s, more preferably 8.0 to 50 mm$^2$/s, still more preferably 9.0 to 20 mm$^2$/s, and particularly preferably 9.0 to 15 mm$^2$/s. In view of improving lubricity under service conditions in a compressor further and enhancing the reliability of a refrigerating machine further, the kinematic viscosity at 100° C. of the refrigerating machine oil is preferably 7.0 mm$^2$/s or more, more preferably 8.0 mm$^2$/s or more, and still more preferably 9.0 mm$^2$/s or more. In view of excellent refrigerant compatibility, the kinematic viscosity at 100° C. of a refrigerating machine oil in this embodiment is preferably 100 mm$^2$/s or less, more preferably 50 mm$^2$/s or less, still more preferably 20 mm$^2$/s or less, and particularly preferably 15 mm$^2$/s or less.

The kinematic viscosity at 40° C. of the refrigerating machine oil in this embodiment may be 3 to 500 mm$^2$/s, and may be 8 to 150 mm$^2$/s or 20 to 100 mm$^2$/s. The viscosity index of the refrigerating machine oil may be 80 or more, and may be 90 to 160.

The pour point of the refrigerating machine oil in this embodiment may be −10° C. or less, and may be −20° C. or less. The pour point mentioned in the present invention means a pour point measured based on JIS K 2269:1987.

In order to prevent the corrosion of metals used for a refrigerator or piping and suppress the deterioration of a refrigerating machine oil itself, the acid value of the refrigerating machine oil in this embodiment is preferably 0.1 mg KOH/g or less, and can be set at 0.05 mg KOH/g or less. The acid value in the present invention means a value measured based on JIS K 2501 "method for testing acid values".

The flash point of the refrigerating machine oil in this embodiment is preferably 120° C. or more, and more preferably 200° C. or more.

The moisture content of the refrigerating machine oil in this embodiment is preferably 200 ppm or less, more preferably 100 ppm or less, and still more preferably 50 ppm or less. In view of the stability and the electrical insulation properties of a refrigerating machine oil, particularly in the case of use for an airtight refrigerating machine, it is required that moisture content is little.

In a working fluid composition for a refrigerating machine according to this embodiment, a refrigerant contains difluoromethane. The refrigerant may be difluoromethane alone, and may further contain known refrigerants such as saturated fluorohydrocarbon refrigerants; unsaturated fluorohydrocarbon refrigerants; fluorine-containing ether-based refrigerants such as perfluoroethers; a bis(trifluoromethyl) sulfide refrigerant; a trifluoroiodomethane refrigerant; and natural refrigerants such as dimethyl ether, carbon dioxide, ammonia and hydrocarbons in addition to difluoromethane. In this case, in view of reduction in global warming potential and refrigerant stability, the content of difluoromethane is preferably 60% by mass or more, more preferably 80% by mass or more, and still more preferably 90% by mass or more, based on the total amount of a refrigerant.

The content of the refrigerating machine oil in the working fluid composition for a refrigerating machine according to this embodiment is not particularly limited, but is preferably 1 to 500 parts by mass, and more preferably 2 to 400 parts by mass based on 100 parts by mass of the refrigerant.

The refrigerant-dissolved viscosity of the working fluid composition for a refrigerating machine according to this embodiment at a temperature of 120° C. and an absolute pressure of 4 MPa is 2.4 mm$^2$/s or more, and is preferably 2.5 mm$^2$/s or more. The refrigerant-dissolved viscosity of the working fluid composition for a refrigerating machine according to this embodiment at a temperature of 120° C. and an absolute pressure 4 MPa may be 10 mm$^2$/s or less.

The low temperature side two-layer separation temperature of the working fluid composition for a refrigerating machine according to this embodiment at the time of a refrigerating machine oil concentration of 10% by mass (a condition in refrigerant compatibility tests illustrated in Examples) is preferably −5° C. or less, more preferably −10° C. or less, still more preferably −15° C. or less, still more preferably −20° C. or less, and still more preferably −25° C. or less, and is usually −70° C. or more, but preferably −40° C. or more, and more preferably −35° C. or more. When the low temperature side two-layer separation temperature is below or in the above-mentioned preferable range, the refrigerating machine oil can be circulated in a refrigerant circulation system with a difluoromethane refrigerant and return to a compressor, and the amount of the refrigerating machine oil in the compressor can be secured enough at the same time. When the low temperature side two-layer separation temperature is above or in the above-mentioned preferable range, the refrigerant-dissolved viscosity can be increased further, oil slicks can be thickened, the lubricity can be improved, and the reliability of refrigerating machines can be enhanced further.

The working fluid composition according to this embodiment can contain various additives in order to further improve lubricity.

Suitable phosphorus-based additives include phosphoric esters, and triphenyl phosphate (TPP) and tricresyl phosphate (TCP) are preferable among phosphoric esters.

Suitable sulfur-based additives include sulfides, and while there are various sulfide compounds, monosulfide compounds are preferable. For example, it is because highly active sulfur compounds such as disulfide compounds deteriorate the stability of refrigerating machine oils and degenerate copper commonly used for the insides of refrigerator machines.

A working fluid composition for a refrigerating machine according to this embodiment is capable of containing additives such as an antioxidant, a friction modifier, an antiwear agent, an extreme pressure agent, an antirust agent, a metal deactivator, and a defoaming agent used for lubricating oils until now besides the above-mentioned additives in order to improve the performance further as long as the object of the present invention is not spoiled.

As the antioxidant, a phenolic compound such as di-tert-butyl-p-cresol, an amine compound such as an alkyldiphenylamine, or the like can be contained. It is preferable to have 0.02 to 0.5% by mass of particularly a phenolic compound antioxidant contained. based on the total amount of the refrigerating machine oil.

The friction modifier includes aliphatic amines, aliphatic amides, aliphatic imides, alcohols, esters, phosphoric ester amine salts, and phosphite ester amine salts, the antiwear agent includes zinc dialkyldithiophosphates, the extreme pressure agent includes olefin sulfides and sulfurized oils and fats, the antirust includes alkenyl succinic esters or partial esters, the metal deactivator includes benzotriazole and benzotriazole derivatives, and the defoaming agent includes silicone compounds and polyester compounds.

Since a refrigerating machine oil and a working fluid composition for a refrigerating machine of the present invention are excellent in refrigerant compatibility and lubricity in the presence of a refrigerant containing difluoromethane, the refrigerating machine oil and the working fluid composition for a refrigerating machine of the present invention are useful in refrigerating and air conditioning systems that have high cooling efficiency, have a compressor, a condenser, a throttle device, an evaporator and the like, and circulate a refrigerant among these. Particularly, in systems having compressors such as rotary type, swing type, and scroll type compressors, a refrigerating machine oil and a working fluid composition for a refrigerating machine of the present invention can be used suitably, and are useful in fields of room air conditioners, packaged air conditioners, refrigerators, air conditioners for automobiles, industrial refrigerating machines and the like.

EXAMPLES

Although the present invention will be described still more specifically based on Examples and Comparative Examples hereinafter, the present invention is not limited to the following Examples at all.

Examples 1 to 12 and Comparative Examples 1 to 8

In Examples 1 to 12 and Comparative Examples 1 to 8, refrigerating machine oils having composition shown in Table 1, 2 and 3 were first prepared by using base materials (base oils) shown below. The composition of base materials is shown in % by mass based on the total amount of a refrigerating machine oil.

[A] Polyol Ester
(A-1) An ester of dipentaerythritol and a mixed acid of 2-methylbutanoic acid and normal pentanoic acid at a molar ratio of 60:40 (kinematic viscosity at 100° C.: 10.9 mm$^2$/s, viscosity index: 110)
(A-2) An ester of dipentaerythritol and a mixed acid of 2-methylbutanoic acid and normal pentanoic acid at a molar ratio of 45:55 (kinematic viscosity at 100° C.: 10.1 mm$^2$/s, viscosity index: 118)
(A-3) An ester of dipentaerythritol and a mixed acid of 2-methylbutanoic acid and normal pentanoic acid at a molar ratio of 35:65 (kinematic viscosity at 100° C.: 9.7 mm$^2$/s, viscosity index: 122)
(A-4) An ester of dipentaerythritol and a mixed acid of 2-methylpropanoic acid and 3,5,5-trimethylhexanoic acid at a molar ratio of 60:40 (kinematic viscosity at 100° C.: 17.8 mm$^2$/s, viscosity index: 99)
(A-5) An ester of dipentaerythritol and a mixed acid of normal pentanoic acid and 3,5,5-trimethylhexanoic acid at a molar ratio of 80:20 (kinematic viscosity at 100° C.: 11.0 mm$^2$/s, viscosity index: 132)
(A-6) An ester of dipentaerythritol and methylpentanoic acid (kinematic viscosity at 100° C.: 10.3 mm$^2$/s, viscosity index: 116)

[B] Complex Ester
(B-1) An ester obtained by additionally reacting 3,5,5-trimethylhexanol (1.0 mol) with an ester intermediate obtained by reacting adipic acid (1.9 mol) with neopentyl glycol (1 mol) and 1,4-butanediol (0.2 mol), and removing remaining unreacted matter by distillation (kinematic viscosity at 100° C.: 18.4 mm$^2$/s, kinematic viscosity at 40° C.: 150.0 mm$^2$/s, viscosity index: 138)
(B-2) An ester obtained by additionally reacting 3,5,5-trimethylhexanol (2.5 mol) with an ester intermediate obtained by reacting adipic acid (2.4 mol) with neopentyl glycol (1 mol) and 1,4-butanediol (0.3 mol), and removing remaining unreacted matter by distillation (kinematic viscosity at 100° C.: 10.6 mm$^2$/s, kinematic viscosity at 40° C.: 67.8 mm$^2$/s, viscosity index: 145)

[C] Other Polyol Ester
(C-1) An ester of pentaerythritol and a mixed acid of 2-methylbutanoic acid and normal pentanoic acid at a molar ratio of 35:65 (kinematic viscosity at 100° C.: 3.9 mm$^2$/s, viscosity index: 110)
(C-2) An ester of pentaerythritol and a mixed acid of 2-methylpropanoic acid and 3,5,5-trimethylhexanoic acid at a molar ratio of 60:40 (kinematic viscosity at 100° C.: 6.3 mm$^2$/s, kinematic viscosity at 40° C.: 46.0 mm$^2$/s, viscosity index: 78)

(C-3) An ester of pentaerythritol and a mixed acid of normal pentanoic acid and 3,5,5-trimethylhexanoic acid at a molar ratio of 80:20 (kinematic viscosity at 100° C.: 4.7 mm²/s, kinematic viscosity at 40° C.: 23.4 mm²/s, viscosity index: 118)

(C-4) An ester of dipentaerythritol and a mixed acid of propanoic acid and 3,5,5-trimethylhexanoic acid at a molar ratio of 65:35

(C-5) An ester of dipentaerythritol and a mixed acid of a linear fatty acid having 19 carbon atoms and 3,5,5-trimethylhexanoic acid at a molar ratio of 80:20

Among these base materials, the synthetic reaction of esters of [A] to [C] was performed without using any catalyst or any solvent, and a minute amount of impurities were removed by adsorption treatment (clay treatment) in the final step. The kinematic viscosity (unit: mm²/s) and the viscosity index were measured and calculated on the basis of JIS K 2283.

Refrigerant compatibility tests and lubricity tests were conducted as follows as to refrigerating machine oils of Examples 1 to 12 and Comparative Examples 1 to 8.

(Refrigerant Compatibility Test)

On the basis of JIS K 2211:2009 "a method for testing compatibility with a refrigerant" of "a refrigerating machine oil", a mixture of 18 g of a difluoromethane refrigerant (R32) and 2 g of refrigerating machine oil was gradually cooled from 20° C. to −40° C., and the temperature at which the mixture separated into phases or at which the mixture became cloudy was evaluated as a two-phase separation temperature. "<−40" indicates that phase separation or cloudiness was not found in the measurement temperature range of the test. In tables, "separation" indicates the mixture had already separated into phases or been cloudy at 20° C. The obtained results are shown in Table 1, 2 and 3. Measured values are shown in ° C.

(Lubricity Test)

The lubricity was evaluated by compressor durability tests that were equivalent to actual machine tests. The compressor durability tests were conducted under the following conditions:

Compressor: 1 HP, rotary compressors;
Refrigerant: R32;
Discharge pressure: 4 MPa;
Suction pressure: 1 MPa; and
Test time: 1000 hours.

Tests were conducted in a cycle where the refrigerating cycle was composed of a compressor, a condenser, an expansion valve (needle valve) and an evaporator, and not including a dryer. The lubricity was evaluated in line with the following standard. The obtained results are shown in Table 1, 2 and 3.

A: Even though 1000 hours passed, seizure did not occur.
B: The occurrence of seizure was confirmed at the time of 500-hour operation.
C: The occurrence of seizure was confirmed at the time of 100-hour operation.

TABLE 1

| Base oil composition (% by mass) | | Example 1 | Example 2 | Example 3 | Example 4 | Example 5 | Example 6 | Example 7 |
|---|---|---|---|---|---|---|---|---|
| (A) | A-1 | 80 | 90 | 80 | — | — | — | — |
|  | A-2 | — | — | — | 88 | 80 | 70 | 80 |
|  | A-3 | — | — | — | — | — | — | — |
|  | A-4 | — | — | — | — | — | — | — |
|  | A-5 | — | — | — | — | — | — | — |
|  | A-6 | — | — | — | — | — | — | — |
| (B) | B-1 | 20 | 10 | — | 12 | 20 | 30 | — |
|  | B-2 | — | — | 20 | — | — | — | 20 |
| (C) | C-1 | — | — | — | — | — | — | — |
|  | C-2 | — | — | — | — | — | — | — |
|  | C-3 | — | — | — | — | — | — | — |
|  | C-4 | — | — | — | — | — | — | — |
|  | C-5 | — | — | — | — | — | — | — |
| Kinematic viscosity at 100° C. of refrigerating machine oil (mm²/s) | | 12.0 | 11.4 | 10.8 | 10.8 | 11.3 | 11.9 | 10.2 |
| Refrigerant compatibility | | −30 | −39 | −35 | −37 | −28 | −7 | −34 |
| Lubricity (seizure resistance) | | A | A | A | A | A | A | A |

TABLE 2

| Base oil composition (% by mass) | | Example 8 | Example 9 | Example 10 | Example 11 | Example 12 |
|---|---|---|---|---|---|---|
| (A) | A-1 | — | — | — | — | — |
|  | A-2 | — | — | — | — | — |
|  | A-3 | 85 | 78 | — | — | — |
|  | A-4 | — | — | 88 | — | — |
|  | A-5 | — | — | — | 88 | — |
|  | A-6 | — | — | — | — | 88 |
| (B) | B-1 | 15 | 12 | 12 | 12 | 12 |
|  | B-2 | — | — | — | — | — |
| (C) | C-1 | — | 10 | — | — | — |
|  | C-2 | — | — | — | — | — |
|  | C-3 | — | — | — | — | — |
|  | C-4 | — | — | — | — | — |
|  | C-5 | — | — | — | — | — |
| Kinematic viscosity at 100° C. of refrigerating machine oil (mm²/s) | | 10.6 | 9.3 | 17.9 | 11.7 | 11.0 |
| Refrigerant compatibility | | −27 | −32 | −8 | −3 | −15 |
| Lubricity (seizure resistance) | | A | A | A | A | A |

TABLE 3

| Base oil composition (% by mass) | | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|
| (A) | A-1 | 100 | — | — | — | — | — | — | — |
|  | A-2 | — | 100 | — | — | — | — | — | — |
|  | A-3 | — | — | 100 | — | — | — | — | — |
|  | A-4 | — | — | — | — | — | — | — | — |
|  | A-5 | — | — | — | — | — | — | — | — |
|  | A-6 | — | — | — | — | — | — | — | — |
|  | B-1 | — | — | — | 100 | 20 | 12 | 12 | 12 |
| (B) | B-2 | — | — | — | — | — | — | — | — |
|  | C-1 | — | — | — | — | — | — | — | — |
|  | C-2 | — | — | — | — | 80 | — | — | — |
| (C) | C-3 | — | — | — | — | — | 88 | — | — |
|  | C-4 | — | — | — | — | — | — | 88 | — |
|  | C-5 | — | — | — | — | — | — | — | 88 |
| Kinematic viscosity at 100° C. of refrigerating machine oil (mm²/s) | | 10.9 | 10.1 | 9.7 | 18.4 | 7.9 | 5.4 | Not measured | Not measured |
| Refrigerant compatibility | | <−40 | <−40 | <−40 | Separation | −23 | −20 | <−40 | Separation |
| Lubricity (seizure resistance) | | C | C | C | A | B | B | C | A |

The invention claimed is:

1. A working fluid composition for a refrigerating machine comprising:
    a refrigerating machine oil comprising:
        a first ester that is a polyol ester of dipentaerythritol and at least one fatty acid selected from fatty acids having 4 to 10 carbon atoms, and has a kinematic viscosity at 100° C. of 7.0 mm$^2$/s or more; and
        a second ester that is a complex ester of a polyhydric alcohol comprising
            at least one selected from neopentyl glycol, trimethylolpropane and pentaerythritol,
            a polybasic acid having 6 to 12 carbon atoms, and
            a monohydric alcohol having 4 to 18 carbon atoms or a fatty acid having 4 to 18 carbon atoms; and
    a refrigerant comprising difluoromethane,
    wherein
        the content of the first ester is 40 to 95% by mass, and
        the content of the second ester is 5 to 40% by mass, based on the total amount of the refrigerating machine oil.

2. The working fluid composition for a refrigerating machine according to claim 1, wherein the fatty acid constituting the first ester comprises a fatty acid having 5 carbon atoms.

3. The working fluid composition for a refrigerating machine according to claim 1, wherein the polyhydric alcohol constituting the second ester further comprises a dihydric alcohol having 2 to 10 carbon atoms other than neopentyl glycol.

4. The working fluid composition for a refrigerating machine according to claim 1, wherein the refrigerant-dissolved viscosity at a temperature of 120° C. and an absolute pressure of 4 MPa is 2.4 mm$^2$/s or more.

5. The working fluid composition for a refrigerating machine according to claim 1, wherein the kinematic viscosity at 100° C. of the first ester is 9.0 mm$^2$/s or more.

6. The working fluid composition for a refrigerating machine according to claim 1, wherein a kinematic viscosity of the refrigerating machine oil at 100° C. is 9.0 mm$^2$/s or more.

7. The working fluid composition for a refrigerating machine according to claim 1, wherein the content of difluoromethane is 60% by mass or more based on the total amount of a refrigerant.

8. The working fluid composition for a refrigerating machine according to claim 1, wherein the constituent polybasic acid of the second ester comprises at least one selected from the group consisting of adipic acid and sebacic acid.

9. The working fluid composition for a refrigerating machine according to claim 1, wherein
    the constituent monohydric alcohol of the second ester comprises at least one selected from the group consisting of 2-ethylhexanol and 3,5,5-trimethylhexanol, and
    the constituent fatty acid of the second ester comprises at least one selected from the group consisting of 2-ethylhexanoic acid and 3,5,5-trimethylhexanoic acid.

10. The working fluid composition for a refrigerating machine according to claim 3, wherein the dihydric alcohol comprises at least one selected from the group consisting of 1,2-butanediol, 1,3-butanediol, 1,4-butanediol, 2,3-butanediol, 1,3-butanediol and 1,4-butanediol.

11. The working fluid composition for a refrigerating machine according to claim 1, wherein the constituent fatty acid of the first ester comprises at least one from the group consisting of branched butanoic acid, linear pentanoic acid, branched pentanoic acid, branched hexanoic acid, branched heptanoic acids, 2-ethylhexanoic acid, and 3,5,5-trimethylhexanoic acid.

12. The working fluid composition for a refrigerating machine according to claim 1, wherein the kinematic viscosity at 100° C. of the first ester is 9.0 to 12 mm$^2$/s.

13. The working fluid composition for a refrigerating machine according to claim 1, wherein a kinematic viscosity at 100° C. of the refrigerating machine oil is 9.0 to 20 mm$^2$/s.

14. The working fluid composition for a refrigerating machine according to claim 1, wherein the content of the first ester is defined as (A) and the content of the second ester is defined as (B) in a refrigerating machine oil, and the content ratio (A)/(B) is 2 to 20 by mass ratio.

15. The working fluid composition for a refrigerating machine according to claim 1, wherein the content of the second ester is 20% or less by mass based on the total amount of the refrigerating oil.

16. The working fluid composition for a refrigerating machine according to claim 2, wherein the constituent fatty acid of the first ester comprises linear pentanoic acid and branched pentanoic acid and the molar ratio linear pentanoic acid/branched pentanoic acid is 95/5 to 5/95.

17. The working fluid composition for a refrigerating machine according to claim 2, wherein the constituent fatty acid of the first ester comprises linear pentanoic acid and 2-methylbutanoic acid.

* * * * *